United States Patent [19]

Haren

[11] 4,092,450
[45] May 30, 1978

[54] CARPET SEAMING STRIP, METHOD OF MAKING SUCH STRIP, AND CARPET EMPLOYING SAME

[75] Inventor: Doyle V. Haren, Clyde, N.C.

[73] Assignee: Dayco Corporation, Dayton, Ohio

[21] Appl. No.: 815,614

[22] Filed: July 13, 1977

[51] Int. Cl.² ............................................. B32B 3/00
[52] U.S. Cl. ...................................... 428/40; 156/72; 156/157; 428/45; 428/58; 428/62; 428/82; 428/88; 428/95; 428/192; 428/193; 428/194
[58] Field of Search ................. 428/40, 44, 45, 58, 428/62, 82, 88, 95, 192, 193, 194; 156/72, 157

[56] References Cited

U.S. PATENT DOCUMENTS

| | | | |
|---|---|---|---|
| 3,077,429 | 2/1963 | Carrigan | 428/62 |
| 3,817,015 | 6/1974 | Frangos | 428/62 |
| 3,969,564 | 7/1976 | Carder | 428/62 |

*Primary Examiner*—Marion E. McCamish
*Attorney, Agent, or Firm*—Reuben Wolk

[57] ABSTRACT

A carpeting strip, method of making such strip, and carpet employing same are provided wherein such carpeting strip has integral joining means enabling the forming of a substantially invisible seam between an adjoining pair of carpeting strips upon providing a carpet employing such strips.

20 Claims, 6 Drawing Figures

U. S. Patent  May 30, 1978  4,092,450
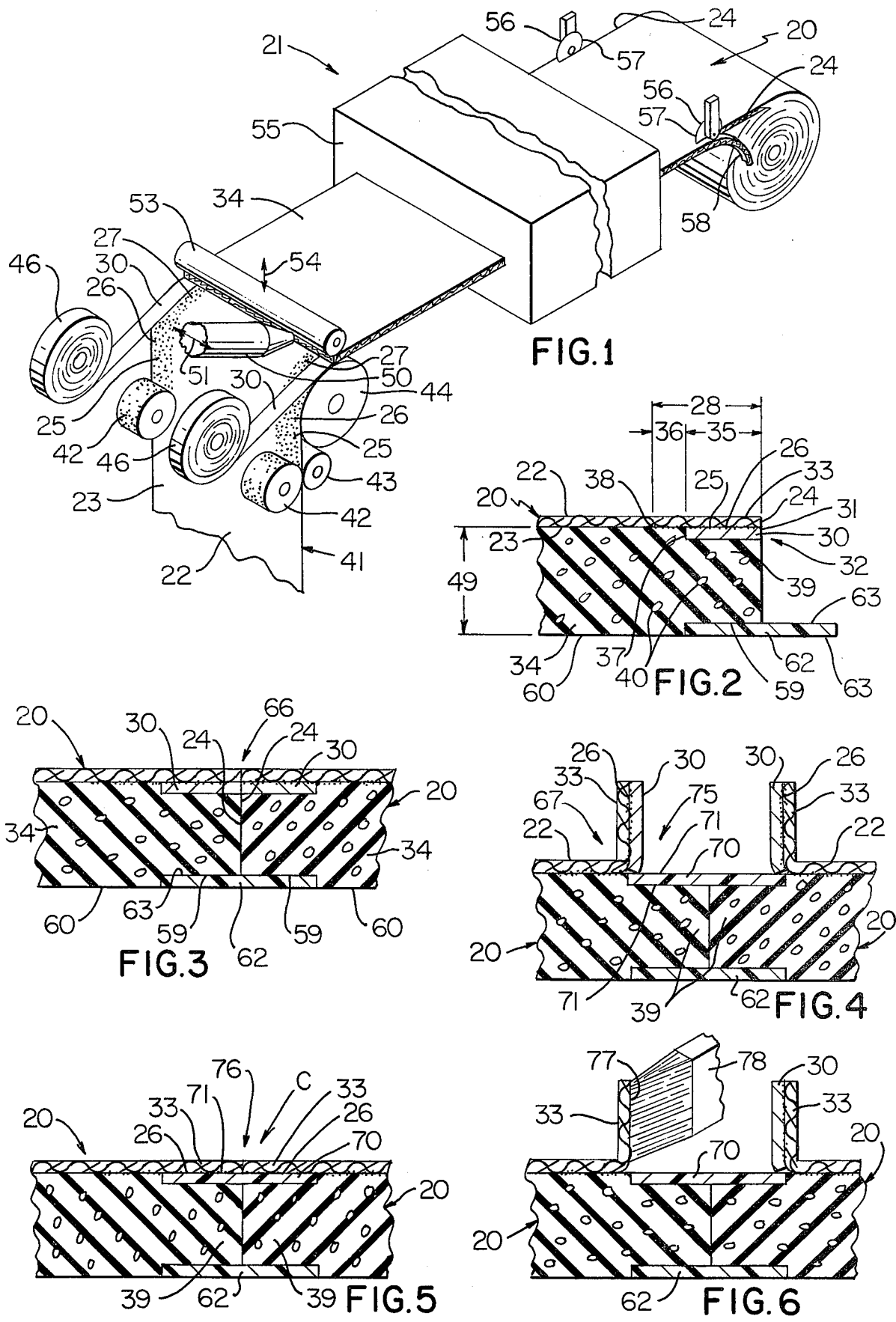

4,092,450

CARPET SEAMING STRIP, METHOD OF MAKING SUCH STRIP, AND CARPET EMPLOYING SAME

BACKGROUND OF THE INVENTION

Carpeting strips comprised of a wear layer bonded against a compressible resilient backing layer made of a material such as foam rubber or sponge rubber are widely used in private dwellings, commercial buildings, and industrial buildings. Usually carpeting strips of this type are manufactured in long lengths and wound on supply rolls thereof for storage, display, and sale. However, carpeting strips of this type are usually comparatively narrow in width, commonly 60 feet wide though often such carpeting strips may be as wide as 15 feet.

However, regardless of the particular width of a carpeting strip it is desirable in defining a carpet therefrom to join side edges of a pair of such carpeting strips in a high strength manner while providing a substantially invisible seam between the adjoining side edges for optimum wear and aesthetic appeal.

SUMMARY

It is a feature of this invention to provide a carpeting strip comprising of a wear layer and sponge-like backing material wherein such strip has integral means enabling a plurality of such carpeting strips to be joined with a substantially invisible seam therebetween.

Another feature of this invention is to provide a carpeting strip of the character mentioned which employs an adhesive band of a particular width and a release tape of a narrower width to enable the provision of a substantially invisible seam when joining associated side edges of a pair of carpeting strips to define a carpet.

Another feature of this invention is to provide a carpeting strip of the character mentioned wherein such adhesive band is defined as a coating and said coating and tape are provided as an integral part of said carpeting strip.

Another feature of this invention is to provide a carpeting strip having integral joining means with such strip comprising a wear layer having a bottom surface and opposed side edges, an adhesive band in the form of a coating disposed against the bottom surface along at least one of the side edges with the coating having an outer portion and an inner portion, a release tape disposed against the outer portion and having an edge disposed in alignment with the side edge with the release tape defining a free part of the wear layer disposed thereagainst, and a compressible backing material bonded against the bottom surface and against the inner portion of the adhesive coating while having a portion of the backing material isolated from the wear layer by the tape. The carpeting strip is particularly adapted to have one side edge thereof disposed in abutting relation against a substantially identical carpeting strip having a substantially identical side edge by removing the tape from the carpeting strip and a similar tape from against an outer portion of an adhesive coating of the identical carpeting strip and bonding the outer portions of the adhesive coatings against support means bridging the said isolated portion of backing material and a similar isolated portion of backing material of the identical carpeting strip.

Another feature of this invention is to provide an improved method of making a carpeting strip of the character mentioned.

Another feature of this invention is to provide an improved method of making a carpeting strip of the character mentioned in a continuous substantially uninterrupted manner.

Another feature of this invention is to provide a carpet comprised of a plurality of carpeting strips of the character mentioned having a substantially invisible seam between each adjoining pair of strips.

Another feature of this invention is to provide an improved method of laying a plurality of carpeting strips to define a carpet having a substantially invisible seam between adjoining pairs of the carpeting strips.

Accordingly, it is an object of this invention to provide an improved carpeting strip, an improved method of making such a carpeting strip, an improved carpet employing a plurality of such carpeting strips, and an improved method of laying a plurality of such carpeting strips having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a primarily schematic presentation with parts in elevation, parts in cross section, and parts broken away illustrating one exemplary embodiment of a carpeting strip of this invention and of an apparatus and method employed in making the same;

FIGS. 2, 3, 4, and 5 illustrate a series of steps employed in installing a pair of adjoining carpeting strips of this invention so as to define a high-strength connection between adjoining side edges thereof and a substantially invisible seam therebetween; and FIG. 6 is a view illustrating a modified method step which may be employed with the steps of FIGS. 2-5 to join associated carpeting strips in a more high-strength manner.

DESCRIPTION OF ILLUSTRATED EMBODIMENTS

Reference is now made to FIG. 1 of the drawing which illustrates one exemplary embodiment of a carpeting strip of this invention which is designated generally by the reference numeral 20 and to an apparatus for and method of making same which is designated generally by the reference numeral 21. The carpeting strip 20 may be used in a narrow area, narrower or equal to its width, to define a complete carpet; however, the strip 20 is such that a plurality of such strips may be installed in adjoining side-by-side relation with a substantially invisible yet high-strength seam between each pair of adjoining carpeting strips and as will be readily apparent from the following description.

As seen in FIGS. 1 and 2 each carpeting strip 20 comprises a wear layer 22 having a bottom surface 23 and opposed side edges each designated by the same reference numeral 24. An adhesive strip-like band or coating 25 indicated by stippling in the form of spaced dots is disposed against the bottom surface 23 of the wear layer 22 and the adhesive coating 25 has an outer portion 26 and an inner portion 27 which define a predetermined width 28 for the adhesive band or coating 25.

A release tape 30 is disposed against the outer portion 26 of the adhesive strip 25 and the tape 30 has an outer edge 31 disposed in alignment with the edge 24 and as shown at 32 in FIG. 2. The release tape 30 defines a free part 33 of the wear layer 22 disposed thereagainst and the free strip 33 of such wear layer is defined by the width 35 of the tape 33. The carpeting strip 20 also has a compressible backing material 34 bonded against the bottom surface 23 of the wear layer 22 and because of the inner portion 27 of the adhesive strip 25 the compressible backing material 34 is more tenaciously bonded in the zone indicated at 36 disposed between an inner edge 37 of the release tape 30 and the inner edge 38 of the adhesive coating 25.

The reference to the free part 33 of the wear layer 22 means that such free part is prevented by the release tape 30 from adhering or being bonded to the compressible backing material 34 disposed therebeneath, in the illustration of the drawing. Similarly, it will be seen that the release tape 30 defines a portion 39 of the backing material 34 which is isolated from the wear layer 22 and in particular from the free part 33 of such wear layer.

The compressible backing material 34 may be any suitable material employed in the carpeting industry and preferably such material is in the form of sponge rubber 34 having a plurality of randomly disposed voids 40 which impart compressibility to the carpet section 20 and provide a yielding, springy feeling underfoot when walking thereon.

The carpet section 20 is preferably made in a substantially continuous manner employing the apparatus and method 21 shown in FIG. 1 of the drawing and as will now be described. In particular, a suitable wear layer 22 is provided from a suitable supply roll (not shown) thereof and supported for unwinding rotation. The layer 22 has a length thereof which is moved vertically as shown at 41.

The wear layer 22 has the band or coating of adhesive 25 applied against each side edge portion of its bottom surface 23 and each adhesive coating 25 of this example is applied utilizing an applicator roll 42 backed by a backup roll 43. Each roll 42 and 43 is supported for rotation about an associated horizontal axis; and, the roll 42 is provided with a suitable adhesive in accordance with any suitable technique known in the art.

The wear layer 22 with adhesive coatings 25 adjoining opposite side edges of its bottom or inside surface 23 is moved over a horizontally disposed comparatively large roll 44 which is also supported for rotation about a horizontal axis parallel to the axes of the rolls 42 and 43. The roll 44 serves as a horizontal support for the layer 22, release tape 30, and sponge rubber 34 applied against the inside surface 23 of the wear layer 22 and in a manner now to be described.

The release tape 30 on each side of the carpeting strip 20 is provided from an associated supply roll 46 thereof and suitably supported for unwinding rotation; and, it will be seen that each tape 30 is disposed against an outer portion 26 of its adhesive coating 25. Each tape 30 is unwound from its roll, applied, and adhered to its outer portion 26 of adhesive coating 25 in a continuous uninterrupted manner simultaneously with the continuous movement of the wear layer 22 through the apparatus 21.

Latex foam defining the sponge rubber 34 is introduced against the inside surface 23 of the wear layer 22, the inner portions 27 of the adhesive coatings 25, and the release tapes 30. The latex foam also designated by the reference numeral 34, for convenience, is introduced using a suitable nozzle 50 which is movable in a reciprocating manner back and forth across the carpeting strip by a mechanism indicated schematically by double arrow 51. The nozzle 50 is suitably operatively connected to a source of latex foam usually in the form of a foaming apparatus (not shown) which may be of any suitable type known in the art. The latex foam is controlled in height by a comparatively small roll 53 which is vertically adjustable by a mechanism indicated schematically by the double arrow 54 to control the height of the latex foam so that the completed carpeting strip 22 has a sponge rubber backing strip which has a height or thickness 49. The roller 53 may be of any suitable type known in the art and has a horizontal axis disposed parallel to the horizontal axis of the support roll 44.

The wear layer 22 with the adhesive coatings 25, release tapes 30, and latex foam defining sponge rubber layer 34 is suitably continuously moved through a controlled temperature environment in the form of a heat tunnel or oven 55 whereupon the latex foam is suitably cured to complete the sponge rubber backing material 34 while simultaneously bonding such backing material against the exposed portion of the bottom surface 23 of the wear layer and inner portions 27 of the adhesive coatings 25. However, it will be appreciated that the portion of the backing material 34 disposed against the release tapes 30 will not adhere thereagainst and thus defines the isolated portions 39 of such backing material.

The carpeting strip is then suitably trimmed employing a pair of trimmers illustrated schematically as a pair of trimming knives 56 which may employ rotary cutting blades 57. The trimmers 56 may be of any suitable type known in the art and each may be backed by suitable backup roll or backup member. The trimmers 56 enable the provision of a pair of sharp edges 24 on the carpeting strip 20 and this is achieved by trimming away a pair of opposed side edge portions 58 of the strip material defining the carpeting strip 20.

A plurality of carpeting strips 20 may be employed to define an overall carpet of this invention and a pair of strips 20 are illustrated in FIG. 5 in their joined condition such that they define such carpet which is designated generally by the reference letter "C". The joining of a pair of carpeting strips 20 will now be described in more detail in connection with FIGS. 2-5.

As seen in FIG. 2 a carpeting strip 20 has an outer part 59 of the bottom surface 60 of its backing material 34 adhered against roughly a half width of a tape 62 and the tape 62 has a pair of opposed comparatively large surfaces 63 which are provided with adhesive means and thus will be described as adhesive surfaces 63. Another carpeting strip 20 which is substantially identical to the carpeting strip 20 of FIG. 2 is disposed with an outer part 59 of the bottom surface 60 of its backing material 34 against the remaining half width of the tape 62 and in particular against a portion of an associated adhesive surface 63. With the carpeting strips 20 thus disposed it will be seen that the edges 24 thereof are in substantially abutting relation and as shown at 66 in FIG. 3.

Each free strip 33 of a wear layer 22 is then disposed transverse and preferably perpendicular to its associated wear layer 22 as shown at 67 in FIG. 4 whereupon support means 70 in the form of tape 70 having an adhesive bottom surface and top surface each designated by the same reference numeral 71 is suitably bonded to above-mentioned isolated portion 39 of the backing material 34 and as shown at 75. Each release tape 30 is then removed from against its adhesive outer portion 26 and the associated free parts 33 bonded against the adhesive top surface 71 of the tape 70 employing the outer portions 26 of the adhesive coating 25 whereupon the free parts 33 are disposed in a substantially coplanar relation and define a substantially invisible seam therebetween and thus a substantially invisible seam between the edges of the carpeting strips 20 and as shown in FIG. 5 at 76.

It will also be appreciated that it may be desired to apply additional adhesive on the inside surfaces of each free part 33 and this may be achieved utilizing any suitable technique known in the art. FIG. 6 illustrates additional adhesive 77 applied against the inner surface of part 33 employing a brush 78.

The carpet C is shown in FIG. 5 and described in connection therewith as having a tape 70 in the form of a so-called double sticky back tape wherein adhesive is provided on its opposed surfaces 71. The tape 70 defines support means 70 bridging the so-called isolated portions 39 of the backing material 34.

However, it will be appreciated that any suitable material may be employed as support means 70 instead of the tape 70. For example, such support means may be in the form of a tape which does not have adhesive material on its opposed surfaces and such adhesive material may be applied upon installation of carpeting strips to define a carpet. It will also be appreciated that the support means 70 may be in the form of a comparatively thick strip comprised entirely of adhesive which upon solidification thereof defines such support means and bridges the backing material beneath the free strip parts 33.

In this disclosure of the invention the adhesive coatings 25 are shown being applied utilizing adhesive application rollers 42; however, it will be appreciated that any suitable adhesive application means or apparatus may be used for this purpose.

The release tape 30 may be made of any suitable material and such tape may be made of paper, plastic, or any other material used in the art as a release tape.

In this disclosure of the invention the tapes 30, 62, and 70 have been shown of exaggerated thickness; however, it will be appreciated that the thicknesses thereof are only a few thousandths of an inch and the exaggerated thicknesses are shown to highlight the detailed features of this invention.

Each adhesive band or coating 25 of the carpeting strip 20 may be of any suitable width; and, in one example of a carpeting strip of this invention a coating 25 approximately 3 inches wide was provided and the release tape used in association with the 3 inch coating of adhesive 25 was roughly 1½ inches wide.

The adhesive 25 may be any suitable adhesive known in the art and one example of an adhesive which has been satisfactorily used is made by the H. B. Fuller Company, 655 Mead Street, P. O. Box 17725, East Atlanta Station, Atlanta, Ga. 30312, and sold under the trade designation Fuller Adhesive M3028.

Each double adhesive back tape 62 and 70 may be any suitable tape known in the art and one example of a tape which has been satisfactorily used is sold by Fasson Incorporated, Industrial Division, 250 Chester Street, Painsville, Ohio 44077, and sold under the trade designation Fasson Double Coated Tape No. 445.

The wear layer 22 comprising the carpeting strip 20 may be any suitable wear layer known in the art. For example such wear layer may be in the form of a woven layer, non-woven layer, and the like. Further, such wear layer may be made of any suitable material known in the art; and it will be appreciated that such material may be a natural material or a synthetic material.

In one example of this invention a needle-punched fabric layer was used successfully.

The term "needle-punched" refers to a conventional woven fabric in which additional fibers are incorporated by forcing these fibers between the interstices of the warps and wefts in a direction at right angles to the plane of the fabric. This is normally done by an operation similar to that of a conventional sewing machine wherein the additional fibers or threads are wrapped around the warps and wefts in order to create a denser fabric. This provides an improved bond between the fabric and the backing material and promotes adhesion thereto.

While present exemplary embodiments of this invention, and methods of practicing the same, have been illustrated and described, it will be recognized that this invention may be otherwise variously embodied and practiced within the scope of the following claims.

What is claimed is:

1. A carpeting strip having integral joining means comprising, a wear layer having a bottom surface and opposed side edges, an adhesive coating disposed against said bottom surface along at least one of said side edges, said coating having an outer portion and an inner portion, a release tape disposed against said outer portion and having an edge disposed in alignment with said side edge, said release tape defining a free part of said wear layer disposed thereagainst, and a compressible backing material bonded against said bottom surface and against said inner portion of said adhesive coating while having a portion of said backing material isolated from said wear layer by said tape, said carpeting strip being particularly adapted to have said one side edge thereof disposed in abutting relation against a substantially identical carpeting strip having a substantially identical side edge by removing said tape from said carpeting strip and a similar tape from against an outer portion of an adhesive coating of said identical carpeting strip and bonding said outer portions of said adhesive coatings against support means bridging said isolated portion of backing material and a similar isolated portion of backing material of said identical carpeting strip.

2. A carpeting strip as set forth in claim 1 in which said wear layer is a woven fabric layer.

3. A carpeting strip as set forth in claim 1 in which said wear layer is a nonwoven fabric layer.

4. A carpeting strip as set forth in claim 1 in which said release tape is a plastic ribbon.

5. A carpeting strip as set forth in claim 1 in which said release tape is a paper ribbon.

6. A carpeting strip as set forth in claim 1 in which said compressible backing material is an elastomeric material.

7. A carpeting strip as set forth in claim 6 in which said elastomeric material is a sponge rubber.

8. A carpeting strip as set forth in claim 7 in which said wear layer is a decorative needle-punched fabric layer.

9. A method of making a carpeting strip having integral joining means, said method comprising the steps of, providing a wear layer having a bottom surface and opposed side edges, applying an adhesive coating against said bottom surface along at least one of said side edges, said coating having an outer portion and an inner portion, disposing a release tape against said outer portion with an edge thereof in alignment with said side edges, said release tape defining a free part of said wear layer disposed thereagainst, and bonding a compressible backing material against said bottom surface and against said inner portion of said adhesive coating while having a portion of said backing material isolated from said wear layer by said tape, said carpeting strip being particularly adapted to have said one side edge thereof disposed in abutting relation against a substantially identical carpeting strip having a substantially identical side edge by removing said tape from said carpeting strip and a similar tape from against an outer portion of an adhesive coating of said identical carpeting strip and bonding said outer portions of said adhesive coatings against support means bridging said isolated portion of backing material and a similar isolated portion of backing material of said identical carpeting strip.

10. A method as set forth in claim 9 in which said step of providing a wear layer comprises providing said wear layer made of a fabric material.

11. A method as set forth in claim 10 in which said applying step comprises applying said adhesive coating with an adhesive-applying roller.

12. A method as set forth in claim 10 in which said disposing step comprises disposing a release tape made of a plastic material.

13. A method as set forth in claim 10 in which said disposing step comprises disposing a release tape made of paper.

14. A method as set forth in claim 10 in which bonding step comprises introducing a foam latex material against said bottom surface, said inner portion of said adhesive coating, and said tape and heat curing said foam latex material to define said compressible backing material.

15. A method as set forth in claim 10 in which said bonding step comprises the preparation step of controlling the thickness of said foam latex material.

16. A method as set forth in cliam 15 in which said step of controlling the thickness of said foam latex material comprises controlling said thickness with a roller.

17. A carpet comprised of at least a pair of carpeting strips having a substantially invisible seam between said pair of carpeting strips; each carpeting strip comprising a wear layer having a bottom surface and opposed side edges, an adhesive coating disposed against said bottom surface along at least one of said side edges, said coating having an outer portion and an inner portion, a release tape disposed against said outer portion and having an edge disposed in alignment with said side edge, and a compressible backing material bonded against said bottom surface and against said inner portion of said adhesive coating while being isolated from said wear layer from said tape; said carpeting strips being disposed with said one side edges thereof in abutting relation with said tapes removed and with said outer portions of said adhesive coating bonded against a support bridging said side edges.

18. A carpet as set forth in claim 17 and further comprising said support bridging said side edges.

19. A carpet as set forth in claim 18 in which said support is a tape having adhesive on both of its opposed surfaces.

20. A carpet as set forth in claim 18 in which said support is a thickness of solidified adhesive material.

* * * * *

UNITED STATES PATENT OFFICE
CERTIFICATE OF CORRECTION

Patent No. 4,092,450            Dated May 30, 1978

Inventor(s) Doyle V. Haren

It is certified that error appears in the above-identified patent and that said Letters Patent are hereby corrected as shown below:

Column 1, line 14, "60" should be -- six --.

Signed and Sealed this

Seventeenth Day of October 1978

[SEAL]

Attest:

RUTH C. MASON  
Attesting Officer

DONALD W. BANNER  
Commissioner of Patents and Trademarks